US006438389B1

(12) United States Patent
Sandhu et al.

(10) Patent No.: US 6,438,389 B1
(45) Date of Patent: Aug. 20, 2002

(54) WIRELESS COMMUNICATION SYSTEM WITH ADAPTIVE BEAM SELECTION

(75) Inventors: Sumeet Sandhu; Arogyaswami Paulraj, both of Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/360,130

(22) Filed: Jul. 23, 1999

Related U.S. Application Data
(60) Provisional application No. 60/094,063, filed on Jul. 24, 1998.

(51) Int. Cl.[7] .................................................. H04B 1/38
(52) U.S. Cl. ....................................... 455/562; 370/332
(58) Field of Search ............................... 375/349, 347; 370/321, 322, 333, 336, 347; 342/374, 373; 455/561, 562, 272, 273, 277.1, 277.2

(56) References Cited

U.S. PATENT DOCUMENTS

| | | | | |
|---|---|---|---|---|
| 5,193,109 A | * | 3/1993 | Lee ............................. | 455/436 |
| 6,032,056 A | * | 2/2000 | Reudink ...................... | 455/560 |
| 6,052,605 A | * | 4/2000 | Meredith et al. ........... | 455/561 |
| 6,167,286 A | * | 12/2000 | Ward et al. ................. | 455/562 |
| 6,198,925 B1 | * | 3/2001 | Lee ............................. | 455/434 |

* cited by examiner

Primary Examiner—Nguyen T. Vo
Assistant Examiner—Nghi H. Ly
(74) Attorney, Agent, or Firm—Lumen Intellectual Property Services, Inc.

(57) ABSTRACT

A wireless communication system has several antennas that are electronically controlled to form N distinct beams (e.g., directional or sectored beams). Each one of the N beams is periodically measured for signal quality for each mobile subscriber. Signal quality measurement can be based on many known techniques. A computer stores and compares the signal quality measurements. The two (or more) best beams are selected using switches controlled by the computer. The best beams are frequency downconverted, digitized and sent to a combiner which combines the best beams to produce a signal having exceptional quality. The computer compares the signal quality measurements and intermittently updates the switch settings for each subscriber so that the best beams are always used for each subscriber. Optionally, three or more of the best beams are combined in the signal combiner. Also, the identified best beam is typically the best for transmission as well, so the invention includes embodiments where beams are transmitted using only the best beam, or best two or more beams. In a preferred embodiment, the set of beams used has a single omnidirectional beam, and several highly directional beams.

14 Claims, 6 Drawing Sheets

WIRELESS COMMUNICATION SYSTEM WITH ADAPTIVE BEAM SELECTION

RELATED APPLICATIONS

This application claims priority from copending provisional patent application No. 60/094,063 filed Jul. 24, 1998, which is hereby incorporated by reference.

This invention was supported in part by grant number DAAH04-95-1-0436 from the Department of the Army. The Government has certain rights in the invention.

FIELD OF THE INVENTION

This invention relates generally to wireless communication systems. More particularly, it relates to a receiver or transceiver device which periodically measures signal quality in several fixed beams. The device selects the highest quality beams for each subscriber unit, and communicates with each subscriber using the best beams.

BACKGROUND OF THE INVENTION

Current wireless communication network topology consists of geographical areas called cells, each of which is centrally controlled by a base station. The base station is physically fixed, and is usually located in the center of the cell. Cellular subscribers set up call connections to the base station, which connects them to other subscribers or to wireline networks such as a landline telephone system.

Within the cell the base station performs functions such as resource allocation to subscribers inside its cell, and medium access control of multiple subscribers attempting to make calls simultaneously. Resources available to the base station depend on the cellular network, and can be a set of time slots per periodic frame. (time-division multiple access or TDMA), frequency channels (frequency division multiple access or FDMA), or spreading codes (code division multiple access or CDMA).

When other subscribers use the same slice of resource as the subscriber of interest (such as the same time slot), the base station receives a signal corrupted by the interfering signals, collectively called cochannel interference (CCI). This degrades signal quality and results in a loss in performance. In TDMA systems base stations in adjacent cells are assigned different frequencies of operation in order to avoid CCI. Because frequencies are a limited resource, however, the same frequency is reused a few cells away. Signals transmitted by a subscriber in that far-away cell often cause CCI at the base station.

One way to reduce CCI is to use multiple antennas at the base station. The signals from the subscriber of interest and the CCI usually arrive along different azimuthal angles (the angle traced in the horizontal plane) at the base station. This occurs because, in general, the two subscribers are typically located at different locations relative to the base station. Angles of arrival at the base station are resolved by using multiple antennas, collectively called an antenna array. The signal received at the set of antennas can be weighted and combined so that the array is more sensitive to signals from certain directions (i.e., the array forms a beams in that direction) Once the directions of arrival of the subscriber's signal and the CCI signal are determined (by using one of many existing signal processing techniques), the CCI signal can be nulled (i.e., the array forms a null in that direction).

Fully adaptive antenna array base stations having a large number of antennas and high computational capability can estimate directions of arrival of the subscriber and the CCI, and then form a beam towards the subscriber while nulling CCI. These arrays also slowly adapt beams over time as the subscriber moves or as objects in the environment move. Such arrays, however, are expensive to implement. Consequently, current base stations often use a simpler and less expensive multiple antenna system called the switched beam system (SBS) to improve signal quality.

A switched beam system includes of a set of fixed beams that partition the horizontal plane (360 degrees) into sectors. Each sector has a certain beamwidth (e.g., 6 uniform sectors would have a beamwidth of 60 degrees each, for a total of 6×60=360). The received signal quality on each beam is measured by a simple metric such as the power of the signal received on that beam. The signal on the beam with the best quality is then demodulated in standard fashion—it is downconverted to a lower frequency, analog-to-digital converted, and decoded into bits in order to estimate the transmitted signal. A simple SBS suppresses CCI if the subscriber signal and CCI signals are well separated in direction. However, it provides low performance when CCI lies within a beamwidth of the beams of the SBS. Also, in environments with severe multipath, SBS provides low performance.

Multipath occurs in cellular environments because the radio frequency (RF) signal transmitted by the subscriber is reflected from physical objects present in the environment such as buildings. As a result, it undergoes multiple reflections, refractions, diffusions and attenuations. The base station receives a sum of these distorted versions of the signal (collectively called multipath). In most environments the multipath arrives along certain dominant directions at certain time delays and with certain attenuations. The spread of the signal along directions is called angle spread and the spread in time is called delay spread. When the subscriber is moving, or objects in the environment are moving (such as vehicles), the signal spreads in frequency, which is called doppler spread.

When the multipath is relatively benign, these directions and delays are not resolvable (angle and delay spreads are negligible), and the signal from a given subscriber appears to arrive from one direction only. In that case, SBS performs well if the subscriber signal and the CCI signal are separated in angle by at least one beamwidth. The SBS beamwidth can be made narrow enough so that signals from different subscribers are far apart in angle with a high probability.

When multipath is severe, both the subscriber signal and the CCI signal may arrive along multiple dominant directions. In that case, these directions may lie within a beamwidth with higher probability. A SBS using only received power as a metric may pick a beam with high CCI power and low signal power instead of a beam with high signal power and low CCI power. In order to help the base station differentiate among subscriber and CCI signals, a known portion of the signal called the color code is intermittently transmitted by all subscribers.

The base station randomly assigns unique color codes to all subscribers within its cell when the subscribers register upon entering the cell. Even across cells the color codes corresponding to the subscriber of interest and the CCI subscribers are different with a very high probability. In order to differentiate subscribers by their color codes, the base station must partially demodulate the signal received on each beam. The chunk of the partially demodulated received signal corresponding to the color code is then correlated with the color code assigned to the subscriber. A high value of the color code correlation implies low CCI on that beam. Therefore high signal power and high color code correlation on a beam means good signal quality.

Partial demodulation requires that the signal be downconverted to a lower frequency and then analog-to-digital converted. The device used for downconversion is called an RF chain, and is one of the more expensive components at the base station. In order to reduce costs, the SBS does not simultaneously downconvert signals received on all beams and compute their color code correlations. It only measures the signal powers on all beams, which can be done with the analog signal (before downconversion). This avoids extra costs of installing RF chains for each beam, and one RF chain can be used to downconvert the beam with the highest signal power.

Prior art SBS systems have poor performance in environments with severe multipath. It would be an advance in the art of wireless communications to provide an enhanced switched beam system that provides robust performance in difficult environments. The enhanced system must provide high quality communication links in the presence of thermal noise, angle spread, delay spread and CCI. Particularly, it would be advantageous to provide increases in network capacity and range coverage while reducing susceptibility to multipath and thermal noise.

OBJECTS AND ADVANTAGES OF THE INVENTION

Accordingly, it is a primary object of the present invention to provide enhanced switched beam wireless communication systems that:

1) has a relatively high tolerance to thermal noise, fading, intersymbol interference, and cochannel interference compared to prior art systems;
2) provides relatively high network capacity and range coverage compared to prior art systems; and
3) has a relatively low cost, a minimum number of components and has a relatively simple construction.

These and other objects and advantages will be apparent upon reading the following description and accompanying drawings.

SUMMARY OF THE INVENTION

These objects and advantages are attained by a wireless communication system having, among other components, a beam former for receiving signals from a number of antennas. The beam former combines received antenna signals to form N beams. The N beams are distinct, which in the present specification means that the beams have different angular sensitivities (sensitivity as a function of angle) and/or different spatial location. The system has at least two beam selector switches. Each beam selector switch selects exactly one of the N beam signals. Each of the beam selector switches selects a different beam signal. The system also includes a signal quality measurement device for measuring the quality of each of the N beam signals, and a computer for receiving signal quality measurements from the measurement device. The computer compares the signal quality measurements and commands the beam selector switches to select the highest quality beams. RF chains (exactly one for each beam selector switch) receive the highest quality beam signals. Each selected beam signal is preferably frequency downconverted and A/D converted by the RF chains. Finally, the system includes a signal combiner for combining the converted signals from the RF chains. This system provides a high quality, robust signal for communication.

The N distinct beams preferably comprise a single omnidirectional beam and N−1 directional beams. Preferably, the number of beam selector switches and RF chains is 2, 3, or 4.

Preferably, the system includes a quality measurement switch in communication with the measurement device for selecting which beam is measured by the measurement device. The system may also have a clock for regularly switching the beam selector switches and the QM switch.

The system may also include transmission electronics for transmitting over the identified best beams. Also preferably, the system is a TDMA system. The antennas may be omnidirectional antennas, sectored (directional) antennas, or a combination of omnidirectional and sectored antennas.

DETAILED DESCRIPTION

The present invention provides a wireless communication system employing switched beams at a base station. The present system has a signal quality measurement device (e.g., power measurement, cyclic redundancy check, color code correlator) that monitors the signal quality of each beam for each active subscriber over time. From these measurements, the system selects the two best beams for each subscriber. The two best beams for different subscribers may be different if subscribers are in different locations. The best beams are combined by a signal combiner. The output of the signal combiner is a robust, high signal-to-interference+noise ratio (SINR) signal. The combined signal from the combiner is used for decoding. The signal quality measurement is performed on a periodic basis. With each measurement the beam quality measurements are updated and stored in a computer memory. In this way, the system continuously tracks the best beams for each subscriber and adaptively activates the best beams according to the measurements. The present invention is particularly well suited for use in time division multiple access (TDMA) wireless communication systems.

Figure 1:
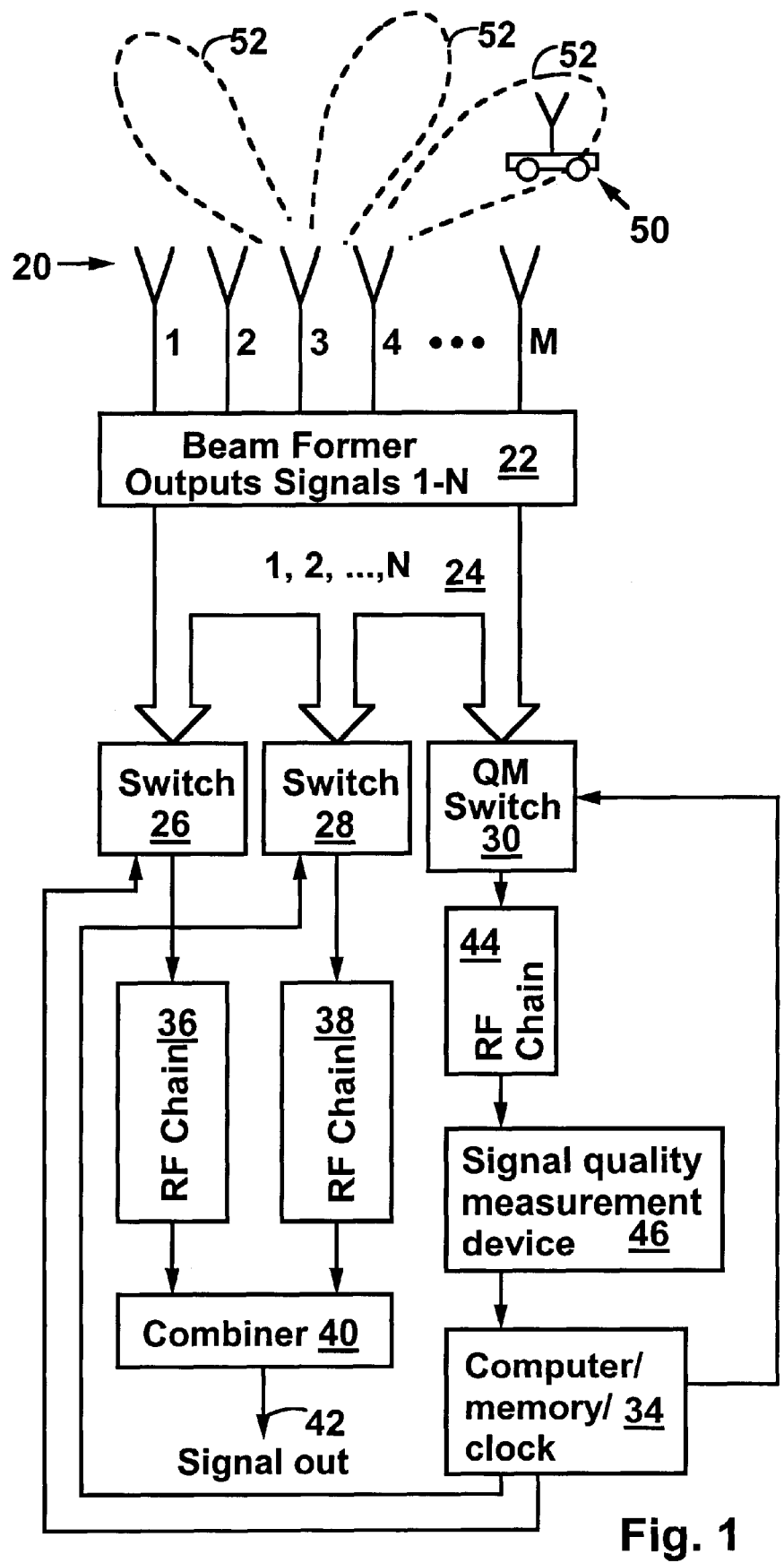
FIG. 1 shows a preferred, simple embodiment of the present invention.

FIG. 1 shows a schematic diagram of a preferred embodiment of the present invention. The device has M antennas 20 labeled 1, 2, 3, 4, . . . , M. The number of antennas can be 3 or more. It is noted that the M antennas can be single omnidirectional antennas, single sectored antennas, or arrays of multiple omnidirectional or sectored antennas. The antennas 20 feed into a beam former 22 that has N output beam signals 24. Each of the N beam signals corresponds to a distinct beam 52. The beam former 22 includes signal processing electronics which selects and combines signals from the M antennas to produce the N beam signals 24. The N beam signals 24 are received by 2 beam selector switches 26, 28, and a quality measurement (QM) switch 30. Each switch 26, 28, 30 selectably outputs exactly one of the N beam signals. All three switches 26, 28, 30 are controlled by a computer 34 with memory and clock for frame, burst, and symbol synchronization. Beam selector switches 26, 28 feed into RF chains 36, 38. The RF chains may contain multistage frequency downconverters, and A/D converters, for example. RF chains are well known in the art.

The RF chains 36, 38 feed into a signal combiner 40. The combiner provides a signal output 42 that is demodulated and decoded into bits to estimate the transmitted signal.

QM switch 30 feeds into a quality measurement (QM) RF chain 44. The QM RF chain 44 may be slightly different from (e.g., may have fewer components than) the RF chains 36, 38. QM RF chain 44 feeds into a signal quality measurement device 46. The signal quality measurement device 46 is capable of measuring the quality of a beam signal according to techniques known in the art of wireless communications. In a preferred embodiment, the signal quality measurement device 46 measures received signal power, baseband eye opening and color code correlation of the signal received on the beam. The QM RF chain 44 may be simpler than the other RF chains because less processing may be required to measure the signal quality. Alternatively, the QM RF chain 44 can be considered to be part of the signal quality measurement device 46.

The computer 34 is in communication with the signal quality measurement device 46 so that the computer receives, stores, and compares information relating to the quality measurements of the beam signals. The computer controls the operation and timing of the switches 26, 28, 30. Each switch 26, 28, 30 selects exactly one of the N beam signals provided to RF chains 36, 38, 44, respectively (i.e., each switch 26, 28, 30 is an N-pull, single-throw device).

In operation, the antennas 20 receive signals from a subscriber 50. The beam former 22 combines signals from the antennas to electronically form beams 52. The beam former 22 electronically forms N distinct beams. In a typical embodiment, most of the beams are highly directional, but it is noted that all the beams do not necessarily need to be highly directional. In a preferred embodiment, one beam is omnidirectional, and all the other beams are directional. Beams can also extend from antenna groups located at different places (e.g., antennas can be separated by 0.5, 1.0 or more wavelengths).

Beam signals 1–N 24 are provided to the inputs of the switches 26, 28, 30. Preferably, QM switch 30 polls or alternates between signals 1–N in a periodic fashion, thereby producing a regular series of signals from distinct beams. These signals pass through RF chain 44 and QM device 46 which then produces signal quality measurements corresponding to the series of signals. These measurements are sent to the computer 34, and the computer selects the two best beam signals for each subscriber. Table 1, for example, shows a simple, arbitrary example for a system communicating with 8 subscribers and using 15 beams (i.e., N=15).

TABLE 1

| Subscriber | Two Best Beam Signals |
| --- | --- |
| 1 | 1, 4 |
| 2 | 2, 13 |
| 3 | 1, 7 |
| 4 | 5, 2 |
| 5 | 9, 12 |
| 6 | 1, 15 |
| 7 | 4, 14 |
| 8 | 1, 7 |

The computer 34 uses the signal quality measurements in controlling the action of the beam selector switches 26, 28. The computer commands the switches 26, 28 to select the two best beam signals for each subscriber. The two best beam signals are sent to the RF chains 36, 38 and combiner 40. In this way, the system tracks the two best beams for each subscriber as the subscriber moves, or as objects in the radio channel between the subscriber and the base station move, or as the signal quality from the subscribers change for any reason.

Figure 2:
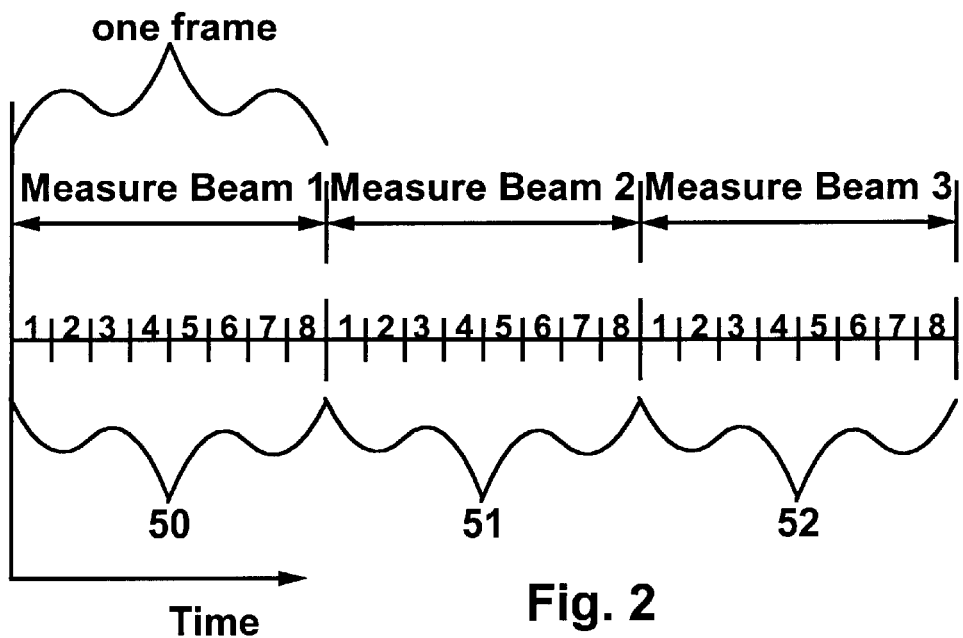
FIG. 2 shows a timeline illustrating the operation of the present invention.

FIG. 2 illustrates a specific implementation for TDMA systems. FIG. 2 is a timeline showing a preferred timing arrangement for signal quality measurement. The operation of the system is divided into frames 50–53. Each frame 50–53 has eight time slots (i.e., bursts) allocated to up to eight distinct subscribers, as is known in the art of TDMA wireless communication. (Note that more than one time slot can be allotted to a single subscriber.) The times slots are labeled 1–8. In a preferred method, the signal quality of beam 1 is measured in every slot of the first frame 50. This provides signal quality measurements for beam 1 for all eight time slots. Next, during second frame 51, the signal quality of beam 2 is measured in all the slots. After N frames, a set of measurements is complete. A complete measurement set includes measurements for every combination of subscriber and beam. When a new set of measurements is complete, the computer updates the operation of the beam selector switches 26, 28. In this way, the system adapts to changes in signal quality and subscriber location over time.

Figure 3:
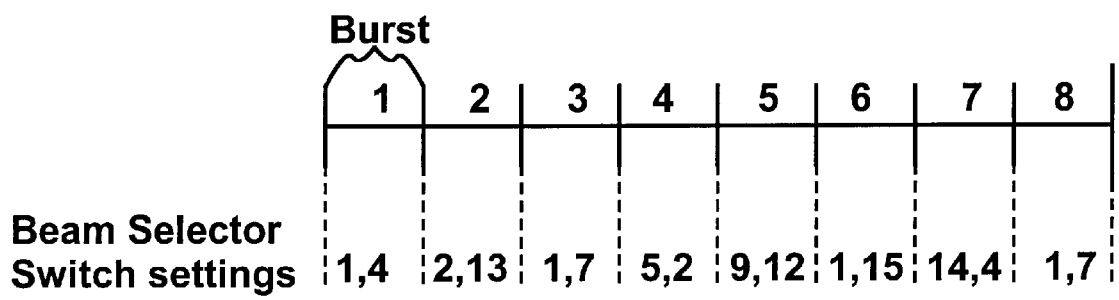
FIG. 3 shows a second timeline illustrating the operation of the present invention.

FIG. 3 shows beam selector switch settings during a single frame for the exemplary measurements given in Table 2. The single frame of FIG. 3 has 8 bursts (one burst for each subscriber). For each burst, the beam selector switches 26, 28 (FIG. 1) select the best beam signals. Therefore, the beam selector switches typically change state with every burst (e.g., 8 times per frame). This is because each subscriber likely has a different set of optimal beam signals. After each complete measurement set (e.g., N frames) the identified best beam signals for each subscriber are updated and may change. It is understood that the numbers given in FIG. 3 are exemplary.

The signal quality measurement device may measure signal quality in many ways that are known in the art. Quality measurements may be made using received signal power, baseband eye opening, color code correlation, and cyclic redundancy check (CRC), for example. The best signal quality measurement technique depends on the type of cellular network used, among other factors. Also, the signal quality metric can be a weighted combination of different quality measurement techniques. For example, a combination of color code correlation and signal power measurement can be used. The weights accorded to the different techniques can be empirically determined. For example, received signal strength is usually a good indicator of signal quality, except in cases where the received signal has a significant component of cochannel interference. Higher cochannel interference is an indication for higher reliance on finer-grained measurements such as CRC or color code correlation. The computer 34 can combine different quality measurement techniques according to a weighting scheme. Further, the weighting scheme can be adaptable for changing conditions (e.g., in cases where different techniques provide conflicting results).

In a typical system there may be 5–2.0 distinct beams, and each frame may be about 2.5 ms long. In such a system, a complete measurement set is produced about every 10–50 ms. Preferably, the computer produces a moving average of the signal quality measurements, and the moving average is used to determine the best beams selected for use. The moving average should have a time scale long enough so that fast fading events (e.g., with time scales shorter than about 5 ms) are averaged out. Slow-fading events having time scales over several seconds (i.e., changes in shadowing caused by objects such as buildings or hills caused by motion of the subscriber), should definitely be captured by the moving average. Preferably, the moving average averages all the signal quality measurements over a time scale of about 10N ms to 100N ms, where N is the number of beams used in the system.

It is also possible to simultaneously measure the signal quality in all N beam signals using N signal quality measurement devices. However, this option is not preferred because of the high cost and complexity of such a system. It is preferred in the present invention to use a single or limited number of signal quality measurement devices.

The signal combiner 40 (FIG. 1) receives signals from the RF chains 36, 38 which have been frequency downconverted and A/D converted by the RF chains. The signal combiner is essentially a space-time filter, with taps on each incoming beam. The taps of the space-time filter can be determined by a number of signal processing techniques available in the art. For example, blind techniques (that do not require training) based on second-order statistics or higher-order statistics (e.g., constant modulus property), or finite alphabet property can be used. Non-blind techniques that require training can also be used. Non-blind techniques can be designed based on optimality criteria such as minimum mean squared error, maximum likelihood estimation, minimum pairwise error probability (PEP).

Figure 4:
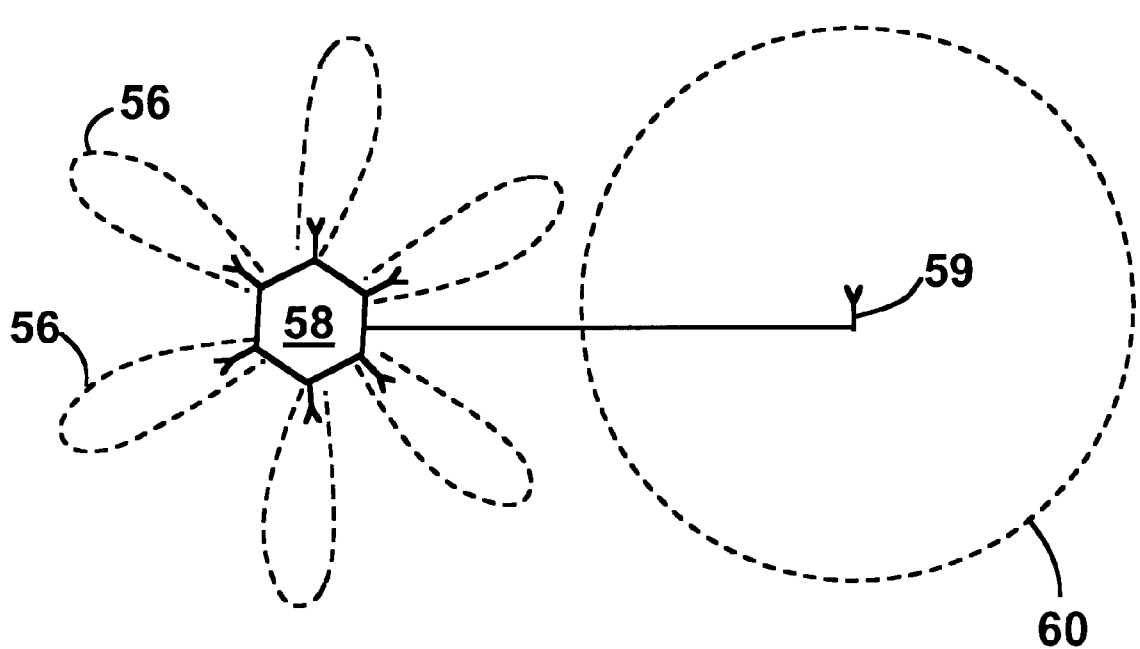
FIG. 4 shows a preferred set of beams used with the present invention.

FIG. 4 shows a preferred beam design for the present invention. The beam design has several highly directional beams 56 extending from sectored antenna system 58. The system design also has a single omnidirectional beam 60 which covers the entire range uniformly. The omnidirectional beam is produced by a separate, omnidirectional antenna 59. The omnidirectional beam 60 helps to ensure that every subscriber within the range has a certain minimum signal quality for at least one beam. Often in this embodiment, the two best beams are the omnidirectional beam 60 and one of the highly directional beams 56. The omnidirectional antenna is recommended whenever the base station has no initial information about the location of the subscriber (e.g., at the beginning of a call). The omnidirectional antenna may also be required for certain signalling slots, such as when the base station broadcasts information intended for all subscribers (e.g., control channel information).

Figure 5:
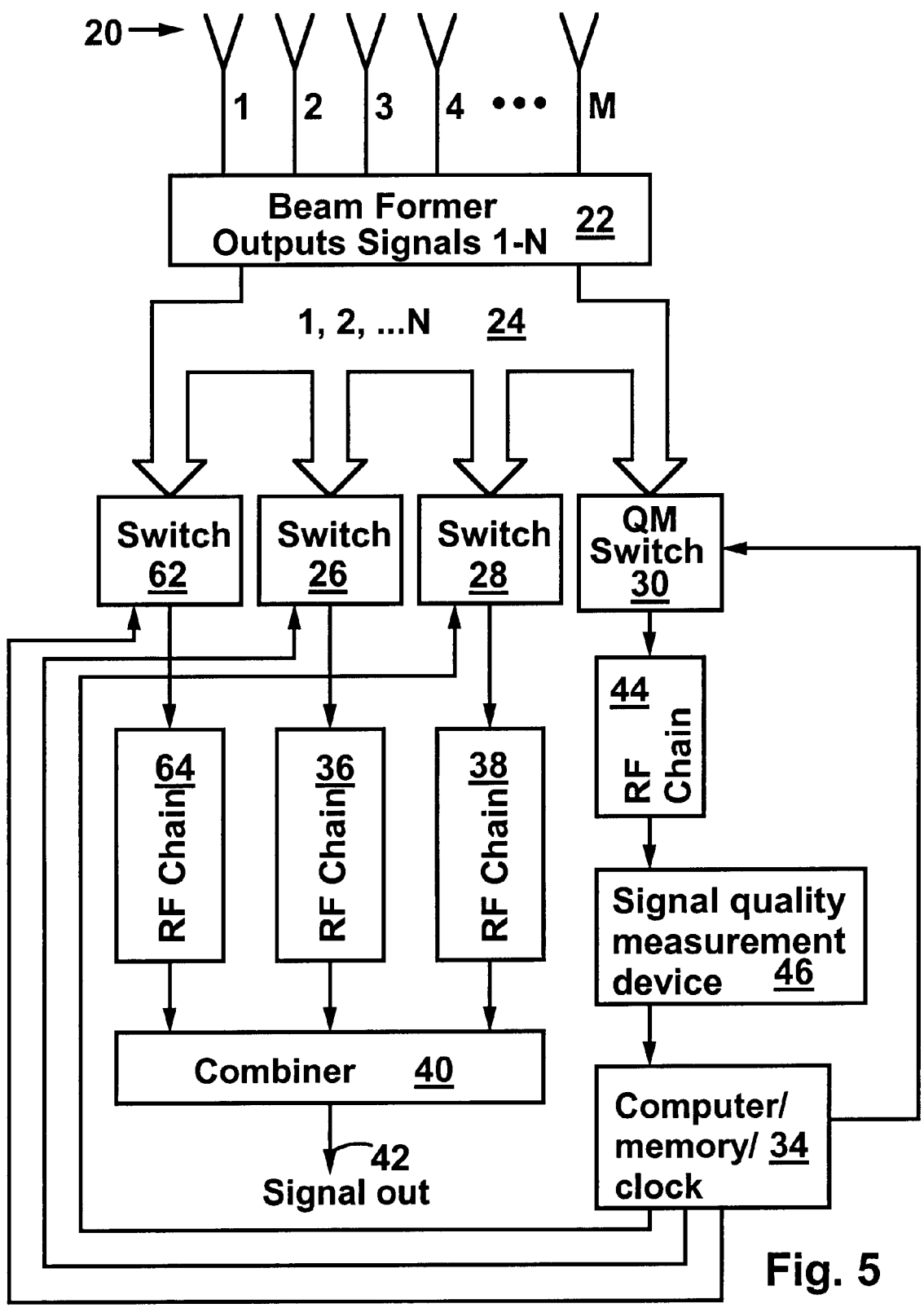
FIG. 5 shows an alternative embodiment that uses three of the best beam signals.

The present invention includes embodiments where more than two beam signals are selected by the beam selector switches. FIG. 5 shows an embodiment where the three highest quality beam signals are selected. In this embodiment, a third beam selector switch 62 is added for selecting the third best beam signal. Also, a third RF chain 64 is included and the combiner 40 receives three signals from the RF chains 36, 38, 64. The operation of the device is otherwise the same as the operation of the device of FIG. 1, except that three best beam signals are selected, instead of only the two best beam signals. The computer 34 controls the operation of the selector switch 62. The device of FIG. 5 will be slightly superior to the device of FIG. 1 due to the diversity provided by inclusion of the third best beam signal.

It is noted that even more beam selector switches (e.g., for a total of 4, 5 or more) can be added for further improvements in device performance. However, each additional beam selector switch and associated RF chain provides diminishing benefits and increased system cost. The optimal number of beams (N) and the number of selector switches (K) can be experimentally determined for a given cellular network. For most wireless communication applications, systems that select the best 2–3 beam signals provide the best value. However, this depends somewhat on the angular selectivity of the beams. Systems using highly directional beams may provide the best value when using the best 4–6, or more beams.

It is noted that the output of the RF chain 44 (in communication with the quality measurement device) may be provided to the combiner 40. In systems where the RF chain 44 is identical to RF chains 36, 38, and the QM switch 30 maintains a given beam signal for the duration of a frame, the downconverted output of the RF chain 44 can be provided to the combiner for additional diversity.

Figure 6:
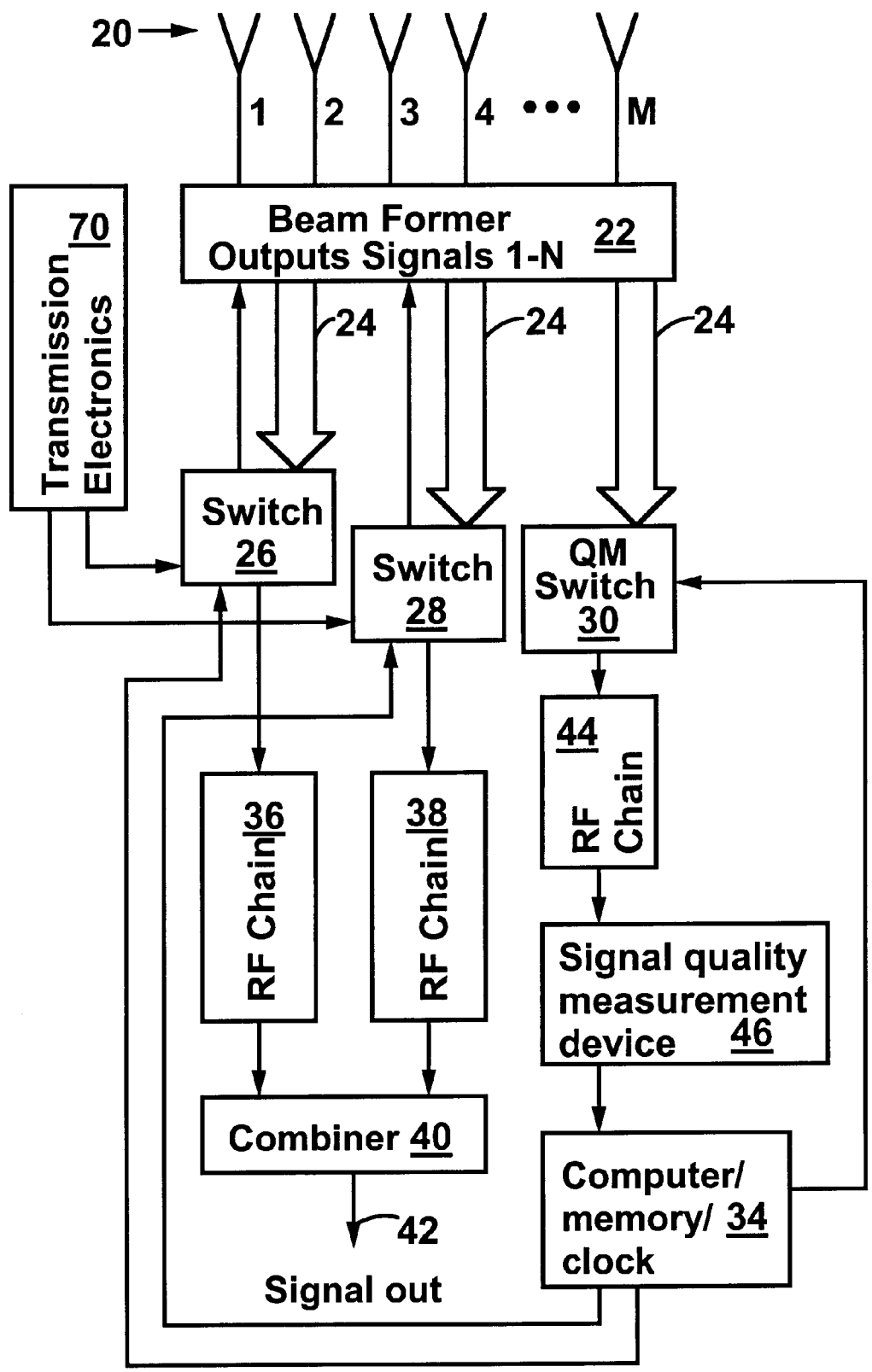
FIGS. 6 and 7 illustrate how transmission electronics can be incorporated into the present invention.
Figure 7:
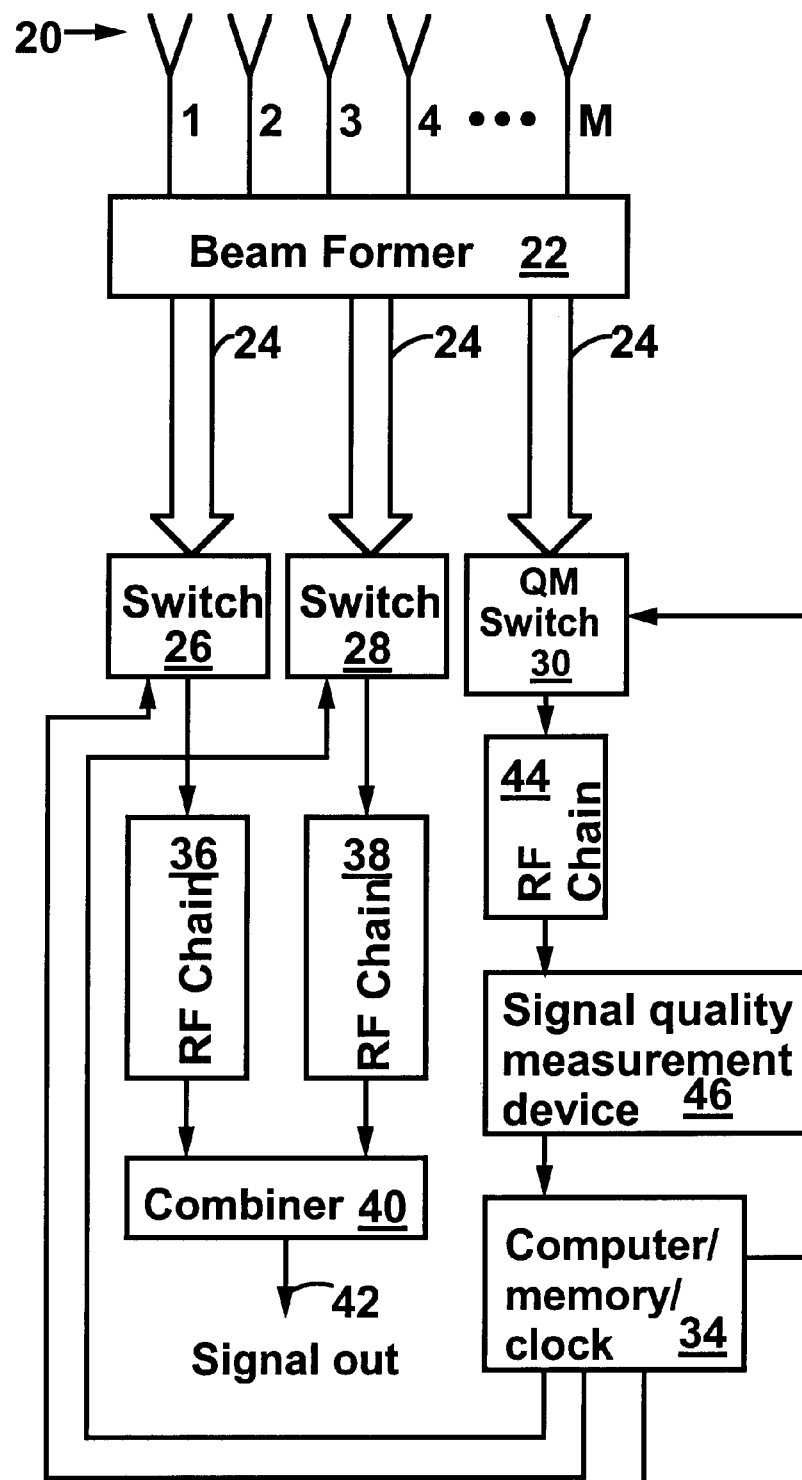
Figure 7:

The adaptive beam selection techniques of the present invention are also applicable to signal transmission because the best beams for reception are often also the best beams for transmission. This is especially true for time division duplex (TDD) systems. FIG. 6 shows an embodiment of the present invention that includes transmission electronics 70. The beam selector switches 26, 28 in this embodiment are not N-pull, single throw devices. There is two-way communication between the switches 26, 28 and the beam former 22. The switches 26, 28 receive signals from the transmission electronics, and pass these signals to the beam former, which activates the antennas 20. In this embodiment, the beam used for transmission is the best beam used for reception. Alternatively, in FIG. 7, separate switches 80 are used with the transmission electronics 70. The switches 80 are controlled in the same manner as switches 26, 28 so that the best beams are selected for transmission. The embodiments shown in FIGS. 6 and 7 are otherwise the same as the embodiment shown in FIG. 1.

It will be clear to one skilled in the art that the above embodiments may be altered in many ways without departing from the scope of the invention. Accordingly, the scope of the invention should be determined by the following claims and their legal equivalents.

What is claimed is:

1. A wireless communication system comprising:
   a) a beam former for receiving signals from a plurality of antennas, and for combining the antenna signals to form N beam signals corresponding to N distinct beams;
   b) K beam selector switches, wherein each beam selector switch selects exactly one beam signal from the N beam signals, and wherein K is an integer greater than or equal to 2;
   c) a signal quality measurement device for measuring signal quality of the-N beam signals;
   d) a computer for receiving signal quality measurements from the measurement device, and for comparing the signal quality measurements, wherein the computer commands the beam selector switches to select high quality beam signals from among the N beam signals;
   e) K RF chains for receiving the K selected beam signals, wherein each RF chain is in communication with a single beam selector switch;
   f) a combiner for combining signals from the RF chains to produce an output signal.

2. The wireless communication system of claim 1 wherein the N distinct beams comprise a single omnidirectional beam and N−1 directional beams.

3. The wireless communication system of claim 1 wherein K=2.

4. The wireless communication system of claim 1 wherein K=3.

5. The wireless communication system of claim 1 wherein K is in the range of 4–6.

6. The wireless communication system of claim 1 further comprising a QM switch in communication with the measurement device, wherein the QM switch selects the beam signal measured by the measurement device.

7. The wireless communication system of claim 6 further comprising a clock for regularly switching the QM switch.

8. The wireless communication system of claim 7 wherein the clock switches the QM switch after every frame.

9. The wireless communication system of claim 1 further comprising transmission electronics, wherein the transmission electronics employs the highest quality beam.

10. The wireless communication system of claim 1 further comprising transmission electronics, wherein the transmission electronics employ K beams corresponding to the K highest quality beams.

11. The wireless communication system of claim 1 wherein the system is a TDMA system.

12. The wireless communication system of claim 1 further comprising M antennas for providing the antenna signals, wherein the M antennas are omnidirectional antennas, and where M is greater than 3.

13. The wireless communication system of claim 1 further comprising M antennas for providing the antenna signals, wherein the M antennas are sectored antennas, and where M is greater than 3.

14. The wireless communication system of claim 1 further comprising M antennas for providing the antenna signals, wherein the M antennas are omnidirectional antennas and sectored antennas, and where M is greater than 3.

* * * * *